United States Patent
Leiba et al.

(10) Patent No.: US 9,436,304 B1
(45) Date of Patent: Sep. 6, 2016

(54) COMPUTER WITH UNIFIED TOUCH SURFACE FOR INPUT

(71) Applicant: GOOGLE INC., Mountain View, CA (US)

(72) Inventors: Aaron Leiba, San Francisco, CA (US); Daniel Fourie, San Mateo, CA (US); Matthew Dominic Tenuta, San Jose, CA (US); Aaron Matthew Eash, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/101,866

(22) Filed: Dec. 10, 2013

Related U.S. Application Data

(60) Provisional application No. 61/898,620, filed on Nov. 1, 2013.

(51) Int. Cl.
*G06F 3/041* (2006.01)

(52) U.S. Cl.
CPC ..................................... *G06F 3/041* (2013.01)

(58) Field of Classification Search
CPC ........................................................ G06F 3/041
USPC .................................................. 345/173–178
See application file for complete search history.

(56) References Cited

U.S. PATENT DOCUMENTS

| | | | |
|---|---|---|---|
| 5,543,588 A * | 8/1996 | Bisset et al. | 178/18.06 |
| 5,666,113 A | 9/1997 | Logan | |
| 5,729,219 A * | 3/1998 | Armstrong et al. | 341/20 |
| 5,847,690 A | 12/1998 | Boie et al. | |
| 6,002,389 A | 12/1999 | Kasser | |
| 6,483,498 B1 | 11/2002 | Colgan et al. | |
| 8,098,233 B2 | 1/2012 | Hotelling et al. | |

(Continued)

FOREIGN PATENT DOCUMENTS

| | | |
|---|---|---|
| EP | 2490096 A2 | 8/2012 |
| GB | 2445178 A | 7/2008 |

(Continued)

OTHER PUBLICATIONS

Blasko, et al., "Single-Handed Interaction Techniques for Multiple Pressure-Sensitive Strips", Extended Abstracts of the Conference on Human Factors in Computing Systems (CHI 2004), Apr. 24-29, 2004, pp. 1461-1464.

(Continued)

*Primary Examiner* — Kent Chang
*Assistant Examiner* — Nathan Brittingham
(74) *Attorney, Agent, or Firm* — Brake Hughes Bellermann LLP

(57) ABSTRACT

In one general aspect, a method can include receiving a plurality of indicators of interactions of a user with a plurality of locations of a touch-sensitive surface of an input area included in a base portion of a computing device. The method further includes receiving a plurality of indicators of pressure associated with at least a portion of the plurality of interactions, selecting a first interaction profile based on a first portion of the plurality of indicators of interactions and based on a first portion of the plurality of indicators of pressure, associating a first input mode with the first portion of the plurality of indicators of interactions based on the first interaction profile. The method still further includes associating a second input mode with a second portion of the plurality of indicators of interactions based on a second interaction profile different from the first interaction profile.

20 Claims, 9 Drawing Sheets

(56) References Cited

U.S. PATENT DOCUMENTS

| | | |
|---|---|---|
| 8,274,494 B2 | 9/2012 | Frey et al. |
| 8,432,362 B2 | 4/2013 | Cheng et al. |
| 2004/0240924 A1* | 12/2004 | Ye .................................. 400/472 |
| 2005/0140661 A1 | 6/2005 | Collins |
| 2006/0026536 A1* | 2/2006 | Hotelling et al. ............ 715/863 |
| 2006/0197753 A1 | 9/2006 | Hotelling |
| 2007/0240044 A1 | 10/2007 | Fux et al. |
| 2007/0247431 A1 | 10/2007 | Skillman et al. |
| 2008/0048990 A1 | 2/2008 | Cho et al. |
| 2008/0084387 A1 | 4/2008 | Mcardle |
| 2008/0158145 A1 | 7/2008 | Westerman |
| 2008/0266143 A1 | 10/2008 | Ohshita et al. |
| 2008/0280658 A1 | 11/2008 | Clemens |
| 2009/0046065 A1 | 2/2009 | Liu et al. |
| 2009/0213081 A1* | 8/2009 | Case, Jr. ....................... 345/173 |
| 2009/0219250 A1 | 9/2009 | Ure |
| 2009/0219257 A1 | 9/2009 | Frey et al. |
| 2009/0284495 A1 | 11/2009 | Geaghan et al. |
| 2009/0322687 A1 | 12/2009 | Duncan et al. |
| 2010/0053087 A1 | 3/2010 | Dai et al. |
| 2010/0079404 A1 | 4/2010 | Degner et al. |
| 2010/0164880 A1 | 7/2010 | Huang et al. |
| 2010/0295797 A1 | 11/2010 | Nicholson et al. |
| 2011/0018556 A1 | 1/2011 | Le et al. |
| 2011/0047459 A1* | 2/2011 | Van Der Westhuizen .... 715/702 |
| 2011/0134071 A1 | 6/2011 | Kim et al. |
| 2011/0187655 A1* | 8/2011 | Min et al. ..................... 345/173 |
| 2011/0193813 A1* | 8/2011 | Gralewski et al. ........... 345/173 |
| 2011/0273396 A1 | 11/2011 | Chung |
| 2012/0038583 A1 | 2/2012 | Westhues et al. |
| 2012/0151412 A1* | 6/2012 | Mine ....................... G06F 1/169 715/810 |
| 2012/0194998 A1* | 8/2012 | McClure et al. ......... 361/679.56 |
| 2012/0212420 A1* | 8/2012 | Shin .................... G06F 3/04883 345/173 |
| 2012/0218210 A1 | 8/2012 | DeCaro et al. |
| 2012/0218221 A1 | 8/2012 | Igeta |
| 2012/0235949 A1* | 9/2012 | Ligtenberg .................... 345/174 |
| 2013/0038572 A1 | 2/2013 | Frey et al. |
| 2013/0063391 A1 | 3/2013 | Kang et al. |
| 2013/0155001 A1 | 6/2013 | Yilmaz et al. |
| 2014/0022193 A1* | 1/2014 | Kim ...................... G06F 3/0488 345/173 |
| 2014/0085254 A1 | 3/2014 | Tenuta et al. |
| 2014/0157163 A1* | 6/2014 | Strutin-Belinoff .. G06F 3/04883 715/769 |
| 2014/0215336 A1* | 7/2014 | Gardenfors ............. G06F 3/017 715/719 |
| 2014/0218298 A1 | 8/2014 | Law et al. |
| 2015/0049042 A1 | 2/2015 | Fujii et al. |

FOREIGN PATENT DOCUMENTS

| | | |
|---|---|---|
| WO | 2011156447 A1 | 12/2011 |
| WO | 2014052743 A1 | 4/2014 |

OTHER PUBLICATIONS

Buxton, et al, "Issues and Techniques in Touch-Sensitive Tablet Input", Computer Systems Research Institute, vol. 19, No. 3, 1985, 10 pages.

* cited by examiner

1000

Receiving a plurality of indicators of interactions of a user with a plurality of locations of a touch-sensitive surface of an input area included in a base portion of a computing device
1010

Receiving a plurality of indicators of pressure associated with at least a portion of the plurality of interactions
1020

Selecting a first interaction profile based on a first portion of the plurality of indicators of interactions and based on a first portion of the plurality of indicators of pressure
1030

Associating a first input mode with a first portion of the plurality of indicators of interactions based on a first interaction profile
1040

Associating a second input mode with a second portion of the plurality of indicators of interactions based on a second interaction profile different from the first interaction profile
1050

FIG. 10

COMPUTER WITH UNIFIED TOUCH SURFACE FOR INPUT

CROSS REFERENCE TO RELATED APPLICATION

This application is a Nonprovisional of, and claims priority to, U.S. Patent Application No. 61/898,620, filed on Nov. 1, 2013, entitled "COMPUTER WITH UNIFIED TOUCH SURFACE FOR INPUT", which is incorporated by reference herein in its entirety.

TECHNICAL FIELD

This description generally relates to computing devices. The description, in particular, relates to a touch-sensitive surface area included in a base portion of a computing device.

BACKGROUND

In general, users prefer lightweight yet elegant computing devices. Miniaturization of computing device components (e.g., hard drives, circuits, batteries, keyboards, etc.) can contribute to reducing the size and weight of a computing device and can allow for the design of smaller, thinner, and slimmer enclosures. In such a computing device, a user input device in a computer can include one or more of, for example, a keyboard, mouse, touchpad, and/or trackpad. A user can interact with the user input device when providing input to and/or otherwise controlling the operation of an application running on the computer. In cases where the computer includes a touchscreen display, the user may, in the alternative, interact with the computing device by making direct contact with (e.g., touching with one or more fingers) the touchscreen.

It can be difficult, however, to reduce the size and weight of a computer when providing a mechanical keyboard and other additional input devices in the computer. In the alternative, displaying a keyboard on the touchscreen display for user interaction may occupy valuable screen display area, diminishing the user's experience with the computer. Thus, a need exists for systems, methods, and apparatus to address the shortfalls of present technology and to provide other new and innovative features.

SUMMARY

In one general aspect, a method includes receiving a plurality of indicators of interactions of a user with a plurality of locations of a touch-sensitive surface of an input area included in a base portion of a computing device. The method further includes receiving a plurality of indicators of pressure associated with at least a portion of the plurality of interactions, selecting a first interaction profile based on a first portion of the plurality of indicators of interactions and based on a first portion of the plurality of indicators of pressure, associating a first input mode with the first portion of the plurality of indicators of interactions based on the first interaction profile. The method still further includes associating a second input mode with a second portion of the plurality of indicators of interactions based on a second interaction profile different from the first interaction profile.

Example implementations may include one or more of the following features. For instance, the first input mode may correspond with an input device type. The first portion of the plurality of indicators of interactions may be mutually exclusive with the second portion of the plurality of indicators of interactions. The first portion of the plurality of indicators may be included in a zone of the touch-sensitive surface of the input area, the zone including a subset of a surface area of the touch-sensitive surface. The first portion of the plurality of indicators may be included in a first zone of the touch-sensitive surface, the first zone including a subset of a surface area of the touch sensitive surface, and the method may further include selecting the second interaction profile based on the second portion of the plurality of indicators being disposed within a second zone of the touch-sensitive surface different from the first zone of the touch-sensitive surface.

The plurality of indicators of interactions of a user with a plurality of locations of a touch-sensitive surface of an input area may be more than ten. The receiving of a plurality of indicators of interactions of a user with a plurality of locations of a touch-sensitive surface of an input area in a base portion of a computing device may include receiving a plurality of indicators of hovering interactions of a user. The first input mode and the second input mode may each be associated with an application. Selecting a first interaction profile may be based on at least one of learned and trained information.

The method may further include receiving a plurality of indicators of time associated with each of the at least a portion of the plurality of interactions, and selecting a first interaction profile may be further based on a first portion of the plurality of indicators of time. The received plurality of indictors of interactions of a user with a plurality of locations of a touch-sensitive surface of an input area may be indicative of an orientation of a human hand. Associating the first input mode with the first portion of the plurality of indicators of interactions may be further based on a first application associated with the first portion of the plurality of indicators, and associating the second input mode with the second portion of the plurality of indicators of interactions may be further based on a second application associated with the second portion of the plurality of indicators.

In another general aspect, an apparatus includes a display portion including a display area, a base portion coupled to the display portion, and a touch-sensitive surface of an input area included in the base portion, the touch-sensitive surface of the input area having a surface area greater than half of a surface area of the display area of the display portion.

Example implementations may include one or more of the following features. For instance, an indication of an interaction of a user at a location of the touch-sensitive surface of the input area may correspond to an interaction of the user with content rendered on the display area of the display portion, the interaction having a one-to-one correspondence with the content rendered on the display area of the portion. The touch-sensitive surface of the input area may include a location detector and a pressure detector. The touch-sensitive surface may be a continuous, non-pliable surface.

The apparatus may further include a rigid backing coupled to the base portion, the rigid backing providing support for the touch-sensitive surface of the input area and made of aluminum or stainless steel.

In yet another general aspect, an apparatus can include a display portion including a display area, a base portion coupled to the display portion, and a touch-sensitive surface of an input area included in the base portion, the base portion excluding a mechanical keyboard.

Example implementations may include one or more of the following features. The touch-sensitive surface of the input area may have a surface area greater than half of a surface area of the display area of the display portion. The display area may be a planar, touch-sensitive surface and the input area may be a planar, touch-sensitive surface.

The details of one or more implementations are set forth in the accompa-nying drawings and the description below. Other features will be apparent from the description and drawings, and from the claims.

BRIEF DESCRIPTION OF THE DRAWINGS

FIG. 10 is a flowchart that illustrates a method of associating an input mode for a computing device with indicators of interactions of a user with an input area included in a base portion of the computing device.

Like reference symbols in the various drawings indicate like elements.

DETAILED DESCRIPTION

Figure 1:
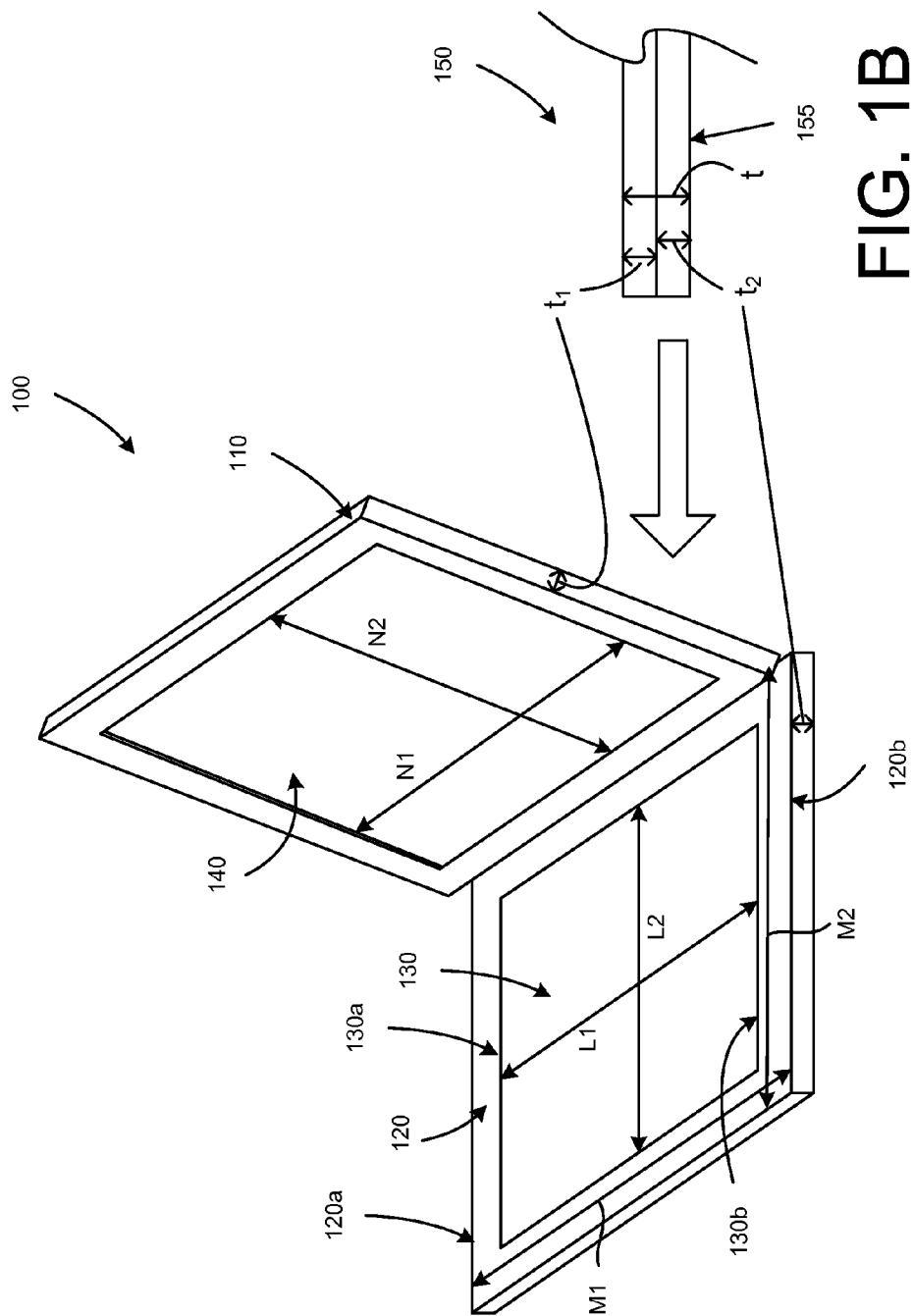
FIG. 1A is a diagram that illustrates an example computing device.
FIG. 1B is a diagram that illustrates a side view of a portion of the example computing device shown in FIG. 1A.

FIG. 1A is a diagram that illustrates an example computing device 100, according to an implementation. In this implementation, the computing device 100 includes a display portion 110 and a base portion 120. The base portion 120 includes an input area 130. The display portion 110 includes a display area 140. The input area 130 can be a touch-sensitive surface that is included in (or mounted on) the base portion 120 of the computing device 100. The display area 140 can be a touch-sensitive display device that is part of (or mounted on) the display portion 110 of the computing device 100.

The input area 130 of the computing device 100 can be disposed over, or included in, the entire surface (e.g., top surface, substantially the entire surface) of the base portion 120 of the computing device 100. The input area 130 can be the same size (e.g., area (e.g., surface area), width and length) or substantially the same size as the base portion 120, thus functioning as a touch-sensitive surface that covers the base portion 120 of the computing device 100. In the computing device 100, the base portion 120 has a first dimension M1 and a second dimension M2, and the input area 130 has a first dimension L1 and a second dimension L2. In some implementations, the first dimension M1 can be substantially equal to the second dimension L1, and the second dimension M2 can be substantially equal to the second dimension L2. In these implementations, the surface area of the input area 130 is substantially equal to the surface area of the base portion 120, covering the base portion 120.

In some implementations, the first dimension M1 can be more than half (e.g., 60%, 70%, 80%, 90%, 95%) of the second dimension L1, and the second dimension M2 can be more than half (e.g., 60%, 70%, 80%, 90%, 95%) of the second dimension L2. In these implementations, the surface area of the input area 130 is less than the surface area of the base portion 120. In some implementations where the surface area of the input area 130 is less than the surface area of the base portion 120, input area 130 can be placed in the center (e.g., center of the top surface) of the base portion 120. In other implementations where the surface area of the input area 130 is less than the surface area of the base portion 120, a first edge 130a of the input area 130 can be placed adjacent to (or aligned with) a first edge 120a of the base portion 120. In yet other implementations where the surface area of the input area 130 is less than the surface area of the base portion 120, a second edge 130b of the input area 130 can be placed adjacent to (or aligned with) a second edge 120b of the base portion 120.

In some implementations, the dimension M1 and the dimension L1 can differ slightly from one another due to tolerance differences between the dimensions of the base portion 120 and the dimensions of the input area 130. Similarly, the dimension M2 and the dimension L2 can differ slightly from one another due to tolerance differences between the dimensions of the base portion 120 and the dimensions of the input area 130. These tolerance differences can ensure that the input area 130 can be placed within the area of the base portion 120 defined by the dimensions M1 and M2, while still covering the majority of the area of the base portion 120. For example, the dimension L1 can be a fixed amount (e.g., 0.5 millimeters) less than the dimension M1, and the dimension L2 can be a fixed amount (e.g., 0.5 millimeters) less than the dimension M2. In another example, the overall dimensions of the input area 130 (L1 and L2) may be a percentage (e.g., 90%) less than the overall dimensions of the base portion 120 (M1 and M2) (e.g., L1 is equal to 90% of M1, and L2 is equal to 90% of M2).

The touch-sensitive surface of the input area 130 can be configured to detect user interactions with the input area 130. The detected user interactions can include, but are not limited to, a location of the interaction within the input area 130 (e.g., where within the input area 130 a user places a fingertip, an X-Y coordinate location of contact of a user with the input area 130), an applied pressure of the interaction (e.g., how much pressure was applied by the fingertip of the user, an indicator of a level of pressure of a user with the input area 130), and a duration of the interaction (e.g., how long did the user keep their fingertip at the location). In addition, the touch-sensitive surface of the input area 130 can detect motion (e.g., a vector motion, a non-linear motion) across the surface of the input area 130. For example, the touch-sensitive surface of the input area 130 can detect the contact of one or more of fingertips of a user with the input area 130. In addition, the touch-sensitive surface can detect contact of all, or of a portion of, the palm of a hand of a user with the input area 130. The touch-sensitive surface of the input area 130 can also detect the amount of pressure a user places on the surface with multiple fingers and the palm of the hand. In addition, the touch-sensitive surface of the input area 130 can detect motion of fingers of a user over the surface of the input area 130. The detected motion can be from one location on the input area 130 to another location on the input area 130.

The use of an input area 130 that is substantially the same size as the base portion 120 and that is a unified touch-sensitive surface for input allows the computing device 100 to detect a variety of user interactions with the input area 130. The computing device 100 when detecting the variety of user interactions with the input area 130 can change input modes dependent on the detected user interaction. The user interactions can include, but are not limited to, typing, scrolling, gestures, selecting, and other user inputs that may otherwise be performed by a user interacting with one or more input devices that are mechanically implemented and, in some cases, external to the computing device 100 (e.g., a keyboard for typing, a mouse for selecting and scrolling). In addition, the unified touch-sensitive surface detects an applied pressure of an input, something the mechanical devices may not be capable of detecting.

For example, a user is running a word processing application on the computing device 100. The placement of fingers and hands of a user in the input area 130 is detected as a virtual keyboard and the user enters text into the document. The user can change the placement of fingers and hands in the input area 130 from one of the detected virtual keyboard input mode to one of a detected input mode for scrolling through the document. For example, the user contacts the input area 130 with one or more fingers and moves the finger(s) in a top to bottom motion within the input area 130 while maintaining contact with the touch-sensitive surface of the input area 130, the input mode changing from one of a virtual keyboard input mode to that of a scrolling input mode. This is just one such example of an input mode change. A variety of input mode changes can be implemented in response to a variety of types of contact with the input area 130.

The changes in mode described above can be implemented in a specific zone or location on the input area 130. In other words, a first mode can be implemented in a portion (e.g., a zone) of the input area 130 in response to a first interaction at a first time (or during a first time period), and a second mode can be implemented in the same portion of the input area 130 in response to a second interaction at a second time (or during a second time period).

As shown in the example computing device 100 of FIG. 1A, the input area 130 of the base portion 120 is devoid of traditional input devices that may be used with computing devices such as a mechanical keyboard, a distinct touchpad, one or more mouse buttons, and a pointing stick or button. In general, most computing devices may include one or more of these traditional input devices as well as other types of distinct and, in many cases, mechanical-type input devices. The inclusion of these traditional input devices in a computing device can add to the overall size and weight of the computing device. A base portion of a computing device that includes one or more of these traditional input devices will need to be of a certain thickness (e.g., greater than 15 millimeters) in order to accommodate the physical parts needed to implement the input device. For example, including a mechanical keyboard in a computing device can increase the overall height of the base of the computing device due to the components (e.g., switches) needed for implementing the mechanical keyboard. In addition, the mechanical keyboard and associated components can add to the overall weight of the computing device.

The unified touch-sensitive surface of the input area 130 can allow a user to provide input to the computing device 100 as they would using any of these other, more traditional input devices (or combinations thereof) while reducing the overall size, thickness, and weight of the computing device. The unified touch-sensitive surface of the input area 130 can be a planar surface (e.g., without bumps, ridges, or other types of irregularities) where the input area 130 is a non-display area. A user can interact with the touch-sensitive surface of the input area 130 in order to enter and/or manipulate information that can be input to an interface displayed in the display area 140, where the interface is associated with an application running on the computing device 100. In some implementations, the display area 140 can also be planar surface. In some implementations, the display area 140 can be a planar, touch-sensitive surface. In cases where the display area 140 is a planar, touch-sensitive surface, by using the unified touch-sensitive surface of the input area 130 the user need not interact with the display area 140.

FIG. 1B is a diagram that illustrates a side view 150 of a portion of the example computing device 100 shown in FIG. 1A. For example, the base portion 120 of the computing device 100 can have a thickness ($t_2$). The base portion 120 can include a rigid backing 155 that can be made of, or can include, for example, a relatively thin sheet of aluminum or stainless steel. For example, the thickness of the aluminum or stainless steel can be a fraction of a millimeter (mm) (e.g., 0.1 mm, 0.15 mm, 0.5 mm). The rigid backing 155 can provide support for the touch-sensitive surface of the input area 130, which can also be made relatively thin. For example, the thickness of the touch-sensitive surface of the input area 130 can be less than 0.5 millimeters (e.g., 0.4 mm, 0.3 mm, 0.2 mm). As such, the overall thickness ($t_2$) of the base portion 120 of the computing device 100 can be less than one millimeter (e.g., 0.45 mm, 0.6 mm, 0.3 mm). In comparison, a traditional mechanical keyboard, when incorporated into a computing device similar to the computing device 100, would cause the base portion 120 of the computing device 100 be at least five millimeters. This does not include the thickness of the backing of the base portion of the computing device that may be needed to support the mechanical keyboard and the forces applied to the keys in order to keep the base portion of the computing device from flexing each time a user presses a key on the keyboard. Therefore, when using a traditional mechanical keyboard in a base portion of a computing device, the overall thickness of the base portion of the computing device would be significantly greater than a thickness, t, of the computing device 100.

The side view 150 of the computing device 100 shows the computing device 100 in a closed position (the display portion 110 is folded down onto and is in contact with the base portion 120). The thickness (t) of the computing device 100 can be determined when the computing device 100 is in the closed position. The thickness (t) of the computing device 100 is the sum of a thickness ($t_1$) of the display portion 110 and the thickness ($t_2$) of the base portion 120. For the computing device 100 in FIG. 1, the thickness ($t_1$) of the display portion 110 can be such that the thickness (t) of the computing device 100 when closed is less than ten millimeters (e.g., 6, mm, 7, mm, 8 mm, 9 mm).

As discussed, a keyboard can be included as an input device to a computing device. A traditional mechanical keyboard can include a switch for each key. The switch provides the input for the key as well as tactile feedback to a user when pressing the key. An alternative to a traditional mechanical keyboard can be a membrane keyboard with keys made of pressure pads. Though the thickness of a membrane keyboard can be thinner than that of a mechanical keyboard, the inherent need to provide switch stroke travel for a membrane switch results in a thickness of a membrane keyboard that is greater that the thickness ($t_2$) of the base portion 120 of the computing device 100.

In addition, when using a physical keyboard as an input device for a computing device, the physical keyboard is of a predetermined fixed size and is located at a permanent position within a base portion of the computing device. The use of a virtual keyboard can allow the keyboard functionality to be input at any position (e.g., X-Y position), orientation (rotational orientation), and/or shape (e.g., area, key spread/area, curvature) within the input area 130 of the base portion 120 of the computing device 100. In addition, for applications that do not require the use of a keyboard, the entire input area 130 can be available for use by the application to detect other types of user input such as gestures at a variety of positions (e.g., X-Y position), orientations (rotational orientation), and/or so forth.

The computing device 100 can identify different kinds of user interactions with the touch-sensitive surface of the input area 130 as usage mimicking the input provided when a user may otherwise have interacted with a mechanical keyboard, a distinct touchpad, a mouse with one or more mouse buttons, and/or a pointing stick as an input device. The computing device 100 can identify different kinds of user interactions with the touch-sensitive surface of the input area 130 that are not possible with a mechanical keyboard, a distinct touchpad, a mouse with one or more mouse buttons, and/or a pointing stick as an input device.

For example, the touch-sensitive surface of the input area 130 can detect the placement of the five fingers and the palm of each of hand of a user in the input area 130. The computing device 100 can determine that the user is interacting with the input area 130 as if it were a keyboard input device based on the configuration of the detected input to the touch-sensitive surface of the input area 130. The touch-sensitive surface of the input area 130 can detect the placement of the fingers and the palm of a first hand of a user relative to the placement of the fingers and the palm of a second hand of the user. The computing device 100 can determine that this input detected by the touch-sensitive surface of the input area 130 indicates the user is interacting with the input area 130 as if it were a keyboard input device. In this case, the input area 130 can function as a virtual keyboard for the computing device 100. The use of a virtual keyboard is described in more detail with reference to FIGS. 4, 5, and 6A.

A user can interact with the input area 130 in order to provide input to or otherwise manipulate content presented to them in the display area 140 of the display portion 110 of the computing device 100. This content can be, for example, graphical and/or textual content. Using the example of the virtual keyboard, a user can interact with the touch-sensitive surface of the input area 130 in order to enter and/or manipulate text that can be input to an interface displayed in the display area 140 and associated with an application running on the computing device 100.

The display area 140 can display a graphical user interface (GUI) that is associated with an application running on the computing device 100. A correspondence can be made between the content shown in the GUI in the display area 140 and a location in the input area 130. This correspondence can allow a user to select, input, or manipulate the content presented to them in the GUI. In some implementations, the dimensions of the input area 130 (L1 and L2) may be substantially the same as the dimensions of the display area 140 (N1 and N2) (e.g., L1 is equal to N1, and L2 is equal to N2). In these implementations, a point on the display can have a 1:1 correspondence with a point on the input area 130. User interactions with the input area 130, therefore, correspond directly to the content displayed in the display area 140.

In another example, the touch-sensitive surface of the input area 130 can detect the placement of fewer than five fingers of a one hand of a user, and the interaction of those fingers with the touch-sensitive surface of the input area 130. The interaction of the fingers of the user with the touch-sensitive surface of the input area 130 can mimic the use of a traditional mouse or trackpad and mouse buttons. For example, the user can select an object displayed in the display area 140 of the display portion 110 of the computing device 100 by placing their finger at a location in the input area 130 that corresponds to the location of the object in the display area 140. The user then drags their finger from one location to another location in the input area 130 in order to perform a particular operation on the selected object. The use of a virtual mouse or trackpad and mouse buttons will be described in more detail with reference to, for example, FIGS. 3A-3B.

As described, in some cases, a correspondence between the display area 140 and the input area 130 can be one-to-one (1:1). In other cases, the input area 130 of the base portion 120 of the computing device 100 may be divided into multiple zones dependent on what is displayed in the display area 140 of the display portion 110 of the computing device 100. In these cases, the correspondence between the display area 140 and the input area 130 may be less than or greater than 1:1. In some cases, each zone may correspond to a portion of an application running on the computing device. In other cases, each zone may correspond to different input to the application running on the computing device. The use of zones in the input area 130 will be described in further detail with reference to, for example, FIGS. 7, 8, 9A, and 9B.

In some implementations, the display area 140 of the display portion 110 of the computing device 100 can also be touch-sensitive. The computing device 100 includes an input area 130 separate from the display area 140. A user interacting with the touch-sensitive surface of the input area 130 can provide various inputs to an application running on the computing device 100 that displays an application interface in the display area 140. The input area 130 provides a mechanism for user input that does not necessitate using any portion of the display area 140 for user input. For example, as described, the touch-sensitive surface of the input area 130 can be a virtual keyboard. In some implementations, the display area 140 of the display portion 110 of the computing device 100 can also be touch-sensitive. A user can provide input to an application using the touch-sensitive surface of the input area 130 as a virtual keyboard without the need for displaying in the display area 140 along with the application interface, a keyboard for user interaction. This allows for a larger area of the display area 140 to be used for displaying the application interface.

In another example, the touch-sensitive surface of the input area 130 can be a virtual mouse/trackpad and mouse buttons. The input area 130 can be configured so that a user can interact with information/objects displayed in the display area 140 without the need to touch the display area 140. The user can interact with the touch-sensitive surface of the input area 130. The hands of the user can be maintained in a more comfortable position (e.g., resting on a relatively flat surface as opposed to extending an arm and pointing to or contacting an upright surface (the display portion 110)). In addition, while interacting with the application interface the hand of the user will not be covering or otherwise blocking other areas of the application interface while they interact with particular information or objects in the application interface.

In some implementations, the display area 140 of the display portion 110 of the computing device 100 may not be touch-sensitive. The use of an input area 130 that includes a touch-sensitive surface allows for the input of touch-sensitive information to an application running on the computing device 100 without the need for a touch-sensitive display.

The input area 130 can use different technologies to detect contact with the input area 130. For example, light-based technologies (e.g., infrared sensors) can detect the presence of a pointing device (e.g., a human finger) near, or the contact of a pointing device with input area 130. The touch-sensitive surface of the input area 130 can use different technologies to detect touch in different implementations, such as resistance-based technologies and/or capacitance-based technologies. A pressure detector also may measure an applied pressure indirectly. For example, the input area 130 can include a capacitively-coupled or resistively-coupled touch-sensitive surface that is used to detect the presence or contact of a pointing device (e.g., a human finger) with the touch-sensitive surface. The touch-sensitive surface of the input area 130 may receive input indicating the presence of a pointing device (e.g., a human finger) near, or the contact of a pointing device with, one or more capacitively-coupled or resistively-coupled elements of the touch-sensitive surface.

In addition, the touch-sensitive surface of the input area 130 can support multi-touch functionality. The support of this functionality allows the touch-sensitive surface of input area 130 to process (e.g., detect) various types of gestures. For example, the touch-sensitive surface of the input area 130 may receive input indicating the presence of a human finger near (e.g., hovering over) or in contact with the input area 130. The touch-sensitive surface of the input area 130 can track the movement of the human finger along the touch-sensitive surface of (or movement of the human finger as it hovers over) the input area 130. The computing device 100 can translate the tracked movement of the human finger into a gesture. For example, the tracked movement may be a swiping motion that can be translated into a gesture for scrolling a page of a document displayed in the display area 140. In another example, the tracked movement may be a swiping motion that can be translated into a gesture for turning a page of a document displayed in the display area 140. In addition or in the alternative, the touch-sensitive surface of the input area 130 can detect and track the movement (e.g., a swiping motion) of more than one human finger in contact with (or more than one human finger as hovering over) the input area 130, translating the movement (e.g., a swiping motion) into a gesture (e.g., scrolling of a page of a document displayed in the display area 140, turning of a page of a document displayed in the display area 140).

The computing device 100 can translate the tracked and detected movement of fingers and/or hand(s) of a user based on the application running on the computing device 100 when the touch-sensitive input area 130 receives the input. For example, if a user is reading an electronic book, the computing device 100 can translate (e.g., identify) a detected gesture into the turning of a page of the book (and can switch from another input mode when doing so). In another example, if a user is running a drawing application, the computing device 100 can translate the detected gesture as the drawing of an object in the application (and can switch from another input mode when doing so). As an example, the detected movement of a human finger on and across the input area 130 can translate into the drawing of a line in the drawing application (and can switch from another input mode when doing so). In some cases, the detected pressure of the human finger on the touch-sensitive surface of the input area 130 can translate into a line width (e.g., a detected light, low-pressure touch results in the drawing of a thin line and a detected heavier, high-pressure touch results in the drawing of a thicker line) (and can switch from another input mode when doing so).

Figure 2:
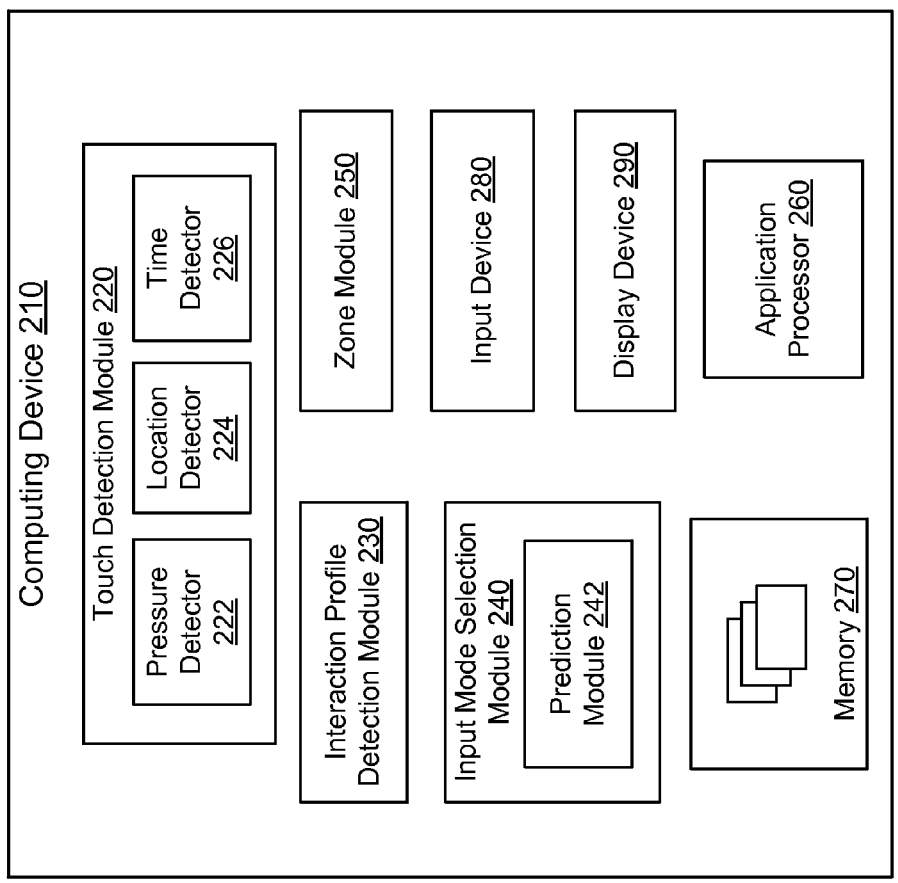
FIG. 2 is a block diagram illustrating example modules included in a computing device.

FIG. 2 is a block diagram illustrating example modules included in a computing device 210. In some implementations, the computing device 210 can be part of or included in the computing device 100 as shown in FIG. 1A.

The computing device 210 includes a touch detection module 220. The touch detection module 220 includes a pressure detector 222, a location detector 224, and a time detector 226. For example, referring to FIG. 1A, the touch detection module 220 can be coupled to and/or receive data from the touch-sensitive surface of the input area 130.

The pressure detector 222 can identify contact with the touch-sensitive surface of an input area by a relatively small area of a finger of a user as a light, low-pressure touch of the finger of the user. The pressure detector 222 can identify contact with the touch-sensitive surface of the input area by a relatively large area of a finger of a user as a heavy, high-pressure touch, because the pad of a human finger spreads out when pressed hard against a surface. The pressure detector 222 can identify contact with the touch-sensitive surface of the input area by the palm of the hand of the user as a uniform, low-pressure touch over an area larger than the contact area of a finger of a user.

In some implementations, a computing device (e.g., the computing device 210) can "learn" over time what a relatively light or short contact is for a particular user and what a relatively heavy or long contact is for the user. For example, the computing device 210 can gather data related to interactions of a user with a touch-sensitive surface of an input area over time. The computing device 210 can store the data in memory 270. The computing device 210 can analyze the stored data, identifying what a relatively light or short contact is for the user and what a relatively heavy or long contact is for the user. This computing device 210 can use this "learned" information in order to make future identifications of what a relatively light or short contact is for the user and what a relatively heavy or long contact is for the user Alternatively, or in addition, a user can train the computing device 210 with regard to particular force-based physical cues. For example, the user can indicate to the computing device 210 (e.g., through a particular user interface associated with an application) that the currently applied touch is a light, short contact touch of the user. In addition, or in the alternative, the user can indicate to the computing device 210 that the currently applied touch is a heavy, long contact touch of the user.

In some implementations, the computing device 210 can "learn" over time the relative location, for each hand of a user, of a detected contact for each of the fingers of the user and for the palm of the hand of the user. Alternatively, or in addition, the user can train the computing device 210 with regard to the particular configuration-based physical cues.

The time detector 226 can identify an amount of time that a finger of a user is in contact with the touch-sensitive surface of an input area. The touch-sensitive surface of the input area can recognize contact of a finger of a user with the touch-sensitive surface over a relatively short time (e.g., less than a threshold time period) as a light, low-pressure touch of the finger of the user. For example, placing a tip of a finger of a user in contact with the touch-sensitive surface of an input area at a particular point or area within the input area for one second or less can be learned by and/or taught to the computing device 210 as a light, low-pressure touch of the finger of the user.

Similarly, the touch-sensitive surface of the input area can recognize contact of a finger of a user with the touch-sensitive surface over a relatively long time (e.g., longer than a threshold time period) as a heavy, high-pressure touch of the finger of the user, because a user generally contacts the touch-sensitive surface for a longer time when pressing hard than when pressing softly. For example, placing a tip of a finger of a user in contact with the touch-sensitive surface of an input area at a particular point or area within the input area for more than two seconds can be learned by and/or taught to the computing device 210 as a heavy, high-pressure touch of the finger of the user.

The pressure detector 222 can determine contact with the touch-sensitive surface of an input area and the location detector 224 can determine a location within the input area of the detected contact. For example, the location detector 224 can identify the location of a point of detected contact within the input area as an X-Y coordinate within an X-Y coordinate space or grid of the input area.

In some cases, the pressure detector 222 can detect contact of the tip of a human finger with the touch-sensitive surface of the input area. In this case, the location detector 224 can identify a point of contact as, for example, an X-Y coordinate or point within an X-Y coordinate space of the input area. In another example, the location detector 224 can identify an area of contact (e.g., a circle) that encompasses the contact of the fingertip with the touch-sensitive surface of the input area.

In other cases, the pressure detector 222 can detect contact of the palm of a human hand with the touch-sensitive surface of the input area. In this case, the location detector 224 can identify an area of contact as a plurality of points within the input area, the distribution of the points corresponding to where the palm of the user contacts the touch-sensitive surface of the input area. In most circumstances, the point distribution may be irregularly shaped. The location detector 224 can define the plurality of points as, for example, encompassing a regularly shaped object (e.g., a circle, rectangle, ellipse, square, etc.) within an X-Y coordinate space of the input area. The location detector 224 can define the regularly shaped object to include all of the identified plurality of points of contact with the touch-sensitive surface of the input area. In this case, it is possible that some of the points within the regularly shaped object will include locations within the input area 130 where the pressure detector 222 may not have detected any contact. In the alternative, the location detector 224 can define the regularly shaped object to include only those points where the pressure detector 222 detected contact with the touch-sensitive surface of the input area. In both cases, the regularly shaped object provides an approximation of a shape that identifies a location within the input area of the detected contact of the palm of the user.

In another example, the location detector 224 can identify the area of contact as an irregularly shaped object, identifying the outline of the object using a plurality of points in an X-Y coordinate space of an input area. The location detector 224 can identify each of the plurality of points as a boundary of the detected contact by the pressure detector 222. For example, a boundary point can be $(x_1, y_1)$ where the pressure detector 222 detects no contact at point $(x_1+1, y_1)$ and point $(x_1, y_1+1)$ and detects applied pressure at $x_1, y_1$.

The computing device 210 can use the data provided by the touch detection module 220 to determine an input mode for the computing device 210. For example, when a user contacts a point on the touch-sensitive surface of an input area, the pressure detector 222 can identify the contact, the location detector 224 can identify the location within the input area of the contact, and the time detector 226 can determine an amount of time for the contact at the identified location.

The touch detection module 220 can identify multiple points and/or areas of contact with the touch-sensitive surface of an input area during a particular time. In addition, the touch detection module 220 can determine an amount of time associated with each detected contact. An interaction profile detection module 230 provides the location of each contact point and the amount of time associated with each contact point and/or area as an interaction profile or set of conditions for the particular time.

The interaction profile detection module 230 can provide the interaction profile to an input mode selection module 240 that can use a prediction module 242 to determine an input mode for the computing device 210. The input mode selection module 240 can identify the input mode as emulating an input device 280.

For example, the touch detection module 220 detects contact of the palm and all five fingers of each hand of a user with the touch-sensitive surface of an input area. Data representative of the contact (e.g., the location of each detected contact in the input area and the amount of time of each detected contact within a particular time) is provided to the interaction profile detection module 230. The interaction profile detection module 230 provides the data to the input mode selection module 240 as an interaction profile. The prediction module 242 using prior learned and trained information determines that, based on the interaction profile data, the user is interacting with the touch-sensitive surface of the input area as if it were a virtual keyboard. The input mode selection module 240, therefore, determines the input mode as a keyboard mode with the input device 280 identified as the virtual keyboard.

The computing device 210 can store learned and trained information for the user and for user interactions with the touch-sensitive surface of an input area in memory 270. The computing device 210, and specifically the prediction module 242, can use the learned and trained information when determining an input mode of the computing device 210. For example, data representative of an average configuration for a hands of a user when placed on the touch-sensitive surface of the input area when interacting with the touch-sensitive surface of the input area as if it were a keyboard can be stored in the memory 270. The prediction module 242 can use the stored data in order to determine if interaction profile data provided to the input mode selection module 240 is for a keyboard input mode of operation. In addition, over time, the stored configuration data for the user of the virtual keyboard input mode of operation can be modified or fine-tuned (learned) based on, for example, the size of the hands of the user.

The recognized contact of a finger of a user with the touch-sensitive surface of an input area can determine the selection of an input to the computing device 210 by the user. For example, when the input mode selection module 240 determines the input mode to be a keyboard mode, the recognized contact of a finger of a user with the touch-sensitive surface of the input area at a particular location can be identified as a selection of a key of the virtual keyboard.

An application processor 260 can execute an application on the computing device 210. The application can display a user interface on a display device 290 of the computing device 210 (e.g., the display area 140 of the computing device 100). A user can interact with the touch-sensitive surface of an input area of the computing device 210 (e.g., input area 130) in order to enter and/or otherwise manipulate information and data in the application as displayed to the user in the user interface. For example, a user can run a word processing application on the computing device 210. The computing device 210 can provide a user interface on the display device 290 that allows a user to enter and manipulate text in a document displayed on the display device 290. A first input mode can be selected based on interaction profile data and the detected contact of the user with the touch-sensitive surface of the input area. For example, the touch detection module 220 detects contact of the palm and all five fingers of each hand of the user with the touch-sensitive surface of an input area and the interaction profile data identifies this interaction while running a word processing application as the user interacting with the touch-sensitive surface of the input area as if it were a virtual keyboard.

In some implementations, the computing device 210 provides a 1:1 correlation between input provided to the touch-sensitive surface of an input area and input to the application as displayed on the display of the computing device 210. In other implementations, a zone module 250 can divide or partition the input area into one or more zones based on an application executing on the computing device 210. In some cases, each zone may accept particular types of user input and may be correlated with a particular part or section of the user interface displayed on the display of the computing device 210 for the application (or applications). For example, a first zone may display one or more icons that a user can select to perform particular operations, the selection made by a finger of a user double tapping a location on the touch-sensitive surface of the input area that corresponds with a selected icon. A second zone may accept text as provided by the user interacting with the touch-sensitive surface of the input area as a virtual keyboard. In some implementations, the zones may be distinct and in other implementations, the zones may overlap.

In some implementations, one or more of the zones may move, or can be associated with portions of a user interface associated with one or more applications running on the computing device 210, the portions of the user interface being displayed on the display device 290 of the computing device 210. Accordingly, one or more zones can have a correspondence with one or more locations (or areas) being displayed on the display device 290.

Figure 3A:
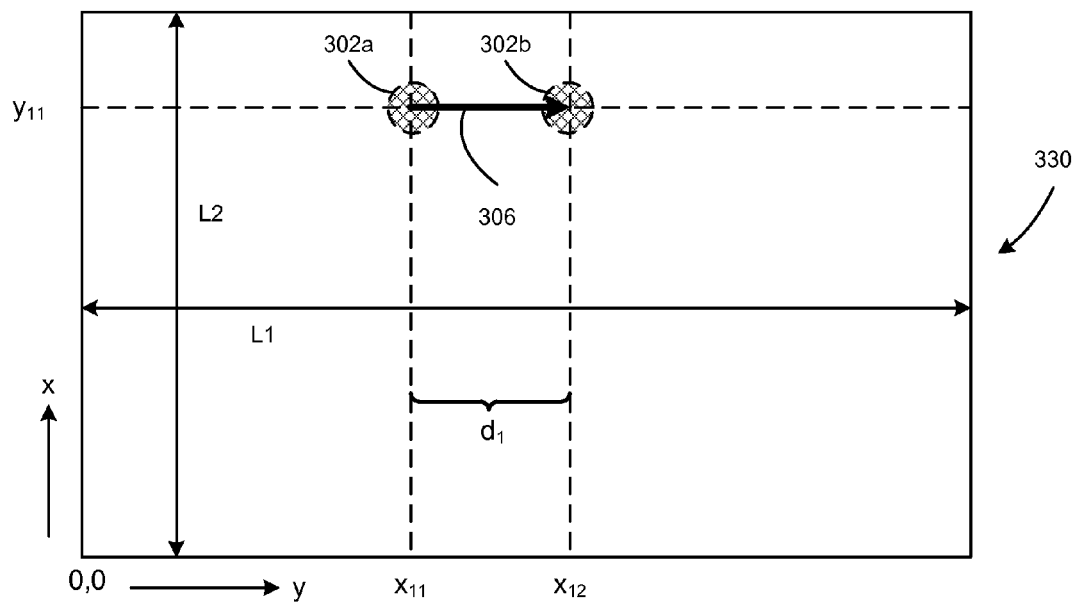
FIGS. 3A and 3B are diagrams that illustrate input to an input area included in a base portion of a computing device and its corresponding activity as shown on a display portion of the computing device.
Figure 3B:
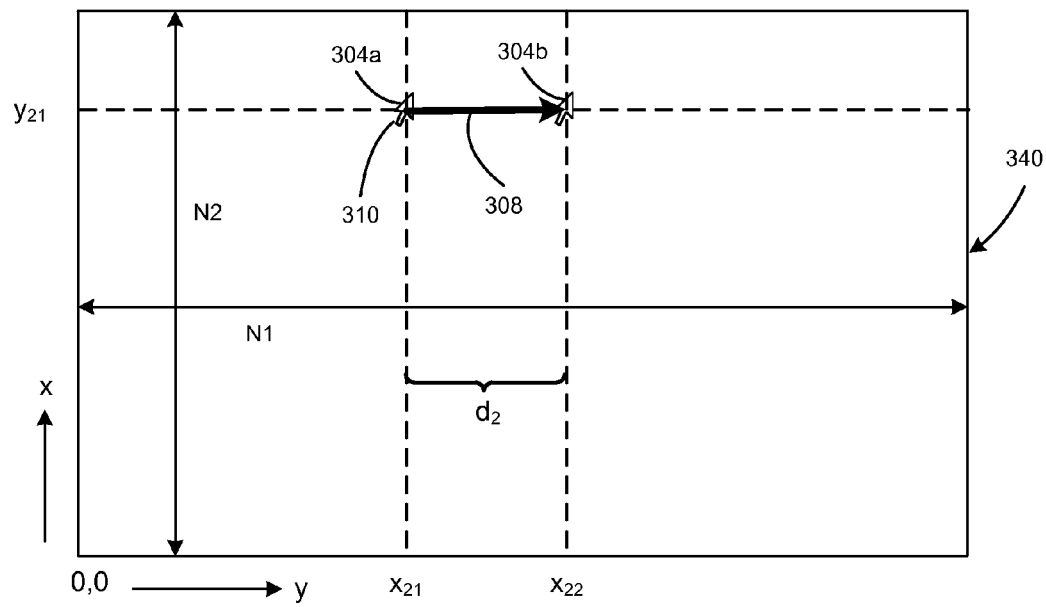

FIGS. 3A and 3B are diagrams that illustrate input to an input area 330 included in a base portion of a computing device and its corresponding activity as shown on a display area 340 of the computing device, respectively.

In the example of FIGS. 3A and 3B, there is a 1:1 or close to a 1:1 (e.g., 1:1.1, 1:0.9, 1.1:1, 0.9:1, etc.) correspondence between the input area 330 and the display area 340 (L2=N2, and L1=N1). For example, a user places a finger at a first location in the input area 330 that is detected as a first point 302*a*. The detected first point 302*a* corresponds to a location 304*a* in the display area 340 (e.g., the user selects an icon that represents a particular file). In some cases, as shown in FIG. 3B, a cursor 310 is shown in the display area 340 that corresponds to the detected first point 302*a*. In other examples, the computing device can provide alternative or additional types of feedback to the user to indicate the corresponding location of the detected first point 302*a* such as visual, haptic, or audio feedback. For example, when an icon is selected, the displayed icon may blink, and/or the finger of the user may sense a slight vibration provided by the touch-sensitive surface of the input area 330, and/or the computing device may emit an audible sound.

The user may then, without breaking contact with the input area 330, drag the finger along a path 306 to a location in the input area 330 detected as the second point 302*b* (e.g., the user drags the file icon over to an icon for a particular folder, effectively moving the file into the selected folder (e.g., a drag-and-drop interaction)). While dragging their finger from a first location to a second location in the input area 330, the display area 340 can provide visual feedback (e.g., the cursor 310 is displayed moving across a path 308 in the display area 340, stopping at location 304*b* corresponding to the second point 302*b*). In some cases, in addition or in the alternative, the computing device can provide haptic feedback by way of the touch-sensitive surface of the input area 330. The computing device may also provide in addition, or in the alternative, audio feedback in the form of a beep or other audible tone.

For example, when a user is running a drawing application, the user may place their finger at a first location in the input area 330 and drag their finger to a second location in the input area 330 effectively drawing a line in the application. In this example, the amount of pressure applied by the finger of a user while dragging their finger from the first location to the second location can determine the thickness of the drawn line (e.g. the greater the pressure, the thicker the line).

In another example, a user places a finger at a first location in the input area 330 that is detected as a first point 302*a*. The detected first point 302*a* corresponds to a location 304*a* in the display area 340 (e.g., the user selects an icon that represents a particular file). The user may then briefly remove the finger from contact with first location in the input area 330 (detected as a first point 302*a*) and then place the finger again at the first location in the input area 330 (detected as a first point 302*a*), effectively "double-clicking" the icon that represents the particular file. This identified "double-click" action may result in the display area 340 displaying further actions a user may select (e.g., "double-click" on) in relation to the file (e.g., open the file, delete the file, etc.).

As described in reference to FIG. 2, in some implementations, the example "double-clicking" action can be associated with a profile that indicates how to interpret the detected input. For example, referring to FIG. 2, the interaction profile detection module 230 can provide the location of one or more contact points and/or areas and the amount of time associated with contact at each contact point and/or area as an interaction profile or set of conditions for the particular time. The interaction profile detection module 230 can provide the interaction profile to an input mode selection module 240 that can use a prediction module 242 to determine an input mode (e.g., a mouse input) for the computing device 210.

The computing device detects a position of the first point 302a at an X-Y coordinate within the input area 330 (e.g., $(x_{11}, y_{11})$). The first point 302a corresponds to a location 304a in the display area 340 at an X-Y coordinate within the display area 340 (e.g., $(x_{21}, y_{21})$). The example of FIGS. 3A and 3B shows a 1:1 correspondence between the input area 330 and the display area 340 (e.g., $x_{11}=x_{21}$, $y_{11}=y_{21}$). The 1:1 correspondence can be specified as a physical measurement and may be referred to as absolute positioning. For example, the movement of a finger of a user a distance $d_1$ in the input area 330 can be measured in centimeters (cm). The corresponding movement of the cursor 310 in the display area 340 is a distance $d_2$ that can also be measured in centimeters. In a case where there is 1:1 correspondence between the inputs to the input area 330 and outputs displayed in the display area 340, the distance $d_1$ is equal to the distance $d_2$ (e.g., if $d_1=1$ cm, $d_2=d_1=1$ cm).

In some implementations, the input area 330 may be larger than the corresponding area in the display area 340 (e.g., input may be allowed in only a portion of an application). In these implementations, the display area 340 may be divided into two or more zones where only a single zone allows user input. Input provided by a user interacting with the input area 330 would be reflected in the single zone in the display portion 340 as, for example, a two-to-one (2:1) correspondence between the input area 330 and the display area 340. The 2:1 correspondence between the input area 330 and the display area 340 can be specified as a physical measurement and may be referred to as relative positioning. For example, the movement of a finger of a user a distance $d_3$ in the input area 330 can correspond to the movement of a cursor in the display portion 340 a distance $d_4$, where the distance $d_3$ is equal to twice the distance $d_4$ (e.g., if $d_3=2$ cm, $d_4=\frac{1}{2}\times d_3=1$ cm). This 2:1 correspondence between the input area 330 and the display area 340 can be beneficial in the case where a user enters information in a drawing application, for example, enabling use of the entire input area 330 for entry of free-form and other types of drawing data into the user interface of the application.

In some implementations, the input area 330 may be divided into multiple zones where a first zone is a virtual keyboard for text entry into a document displayed in the entire area of the display area 340 and a second zone allows scrolling of the document. For example, in these implementations, a one-to-two (1:2) correspondence may exist between the second zone of the input area 330 and the display area 340. The 1:2 correspondence can be specified as a physical measurement and may be referred to as relative positioning. For example, the movement of a finger of a user a distance $d_5$ in the input area 330 can correspond to the movement of a cursor in the display portion 340 a distance $d_6$, where the distance $d_6$ is equal to twice the distance $d_5$ (e.g., if $d_5=1$ cm, $d_6=2\times d_5=2$ cm).

Though examples of a 1:1, 2:1, and a 1:2 correspondence between the input area 330 and the display area 340 are provided, other correspondences between the input area 330 and the display are 340 may be implemented. For example, a 1:x and an x:1 correspondence between an input area and a display area of a computing device may be implemented. In another example, dynamic scaling (an x:y correspondence) can occur between an input area and a display area. The numerical value of "x" and the numerical value of "y" may be determined based on, for example, one or more characteristics of the computing device that can include, but are not limited to, the size of the base portion, the dimensions of the input area, the size of the display portion, the dimensions of the display area, and the number of zones included in the input area.

In some cases, dynamic scaling can occur between an input area and a display area of a computing device dependent on a detected input mode of operation. For example, when interacting with a drawing application running on a computing device, a user may interact with at least a portion of a touch-sensitive surface of an input area in order to scroll through or otherwise navigate a document displayed in a display area of the computing device. In this mode of operation, a 2:1 correspondence can exist between the display area and the input area. The user then interacts with at least a portion of the touch-sensitive surface of the input area in order to draw a line, for example, in the drawing application. In this mode of operation, a 1:1 correspondence can exist between the display area and the input area.

Figure 4:
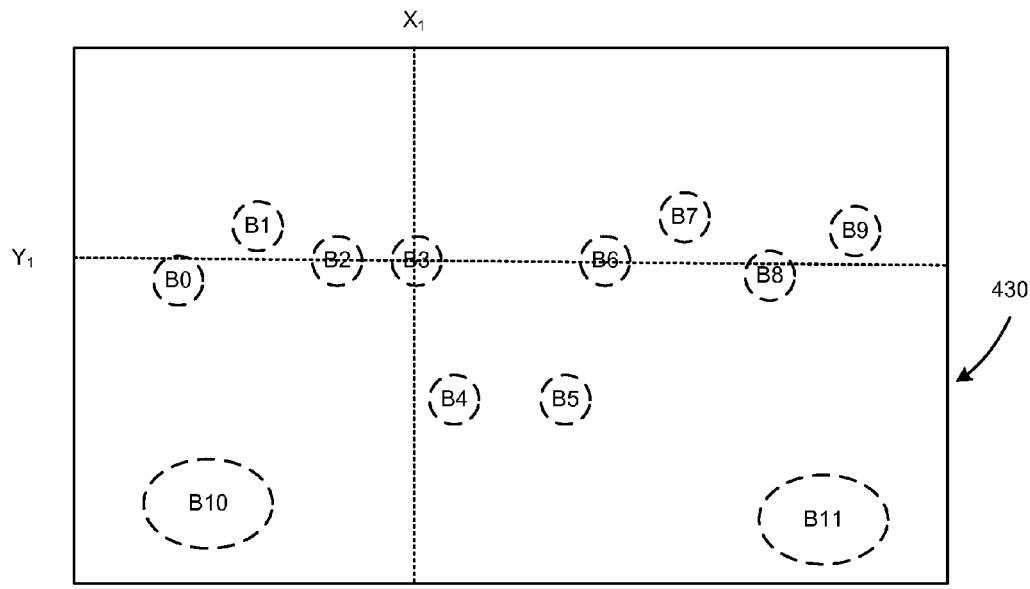
FIG. 4 is a diagram that illustrates detected location information and/or pressure data as input to an input area included in a base portion of a computing device.

FIG. 4 is a diagram that illustrates detected location information and/or pressure data as input to an input area 430 included in a base portion of a computing device. In the example of FIG. 4, and referring to FIG. 2, the computing device (e.g., using the touch detection module 220) can identify points B0-B9 and areas B10-B11 based on detected contact (e.g., contact detected by the pressure detector 222) and a location of the detected contact (e.g., the location determined by the location detector 224). In addition, the computing device can determine how long (e.g., using a time detector such as the time detector 226) and with how much pressure the user contacts the touch-sensitive surface of the input area 430 (based on a threshold condition and/or threshold values) at the detected points B0-B9 and areas B10-B11. In some implementations, the points B0-B9 can be areas.

The computing device (e.g., using the interaction profile detection module 230) can identify the detected points as a profile or condition for input to the computing device. Based on the identified profile or condition, the computing device can determine that the detected points B0-B9 and areas B10-B11 represent the placement of hands of a user on the touch-sensitive surface of the input area 430 as if they were interacting with a virtual keyboard. For example, the interaction profile detection module 230 can provide the profile to the input mode selection module 240 that includes the prediction module 242. The input mode selection module 240 can determine that the input mode is text and the input device 280 is a keyboard.

The determination of an input mode for the computing device can be based on learned and trained information that identifies points B0-B9 as the contact of each of the fingers (finger tips) of the user with the touch-sensitive surface of the input area and areas B10-B11 as the contact of the palm of each of the hands of the user.

As shown in FIG. 4, the areas B10-B11 are indicated as an oval area in the input area 430. As described in FIG. 2, the indication of the areas B10-B11 could be another regular shape (e.g., a circle, rectangle, or square) or an irregular shape marking the boundary of the contact of the palm of the hand of the user with the touch-sensitive surface of the input area 430.

An applied pressure at each of the points B0-B9 can indicate if the user is providing input to the computing device. For example, a detected light, low-pressure touch (based on a threshold condition and/or values) at each point B0-B9 can indicate the user is merely resting their hands on the input area 430. The detection of a heavy, high-pressure touch at a particular one of the points B0-B9 can indicate the user is providing input at that point location (e.g., pressing a key on the virtual keyboard). The detection of this heavy, high-pressure touch at the particular one of the points B0-B9 can be reflected in the input of a character to a document displayed in a user interface on a display portion of a display area of the computing device. In another example, the detection of a pressure at one particular point that is different than the detected pressure at the other points can also indicate the user is providing input at that point location (e.g., pressing a key on the virtual keyboard).

For example, the detected pressure (based on a threshold condition and/or values) of the point B3 indicates input at the detected location coordinate $(x_1, y_1)$ for the point B3. In the case of a virtual keyboard, the detected location coordinate $(x_1, y_1)$ for the point B3 is indicative of an input key of the virtual keyboard.

Figure 5:
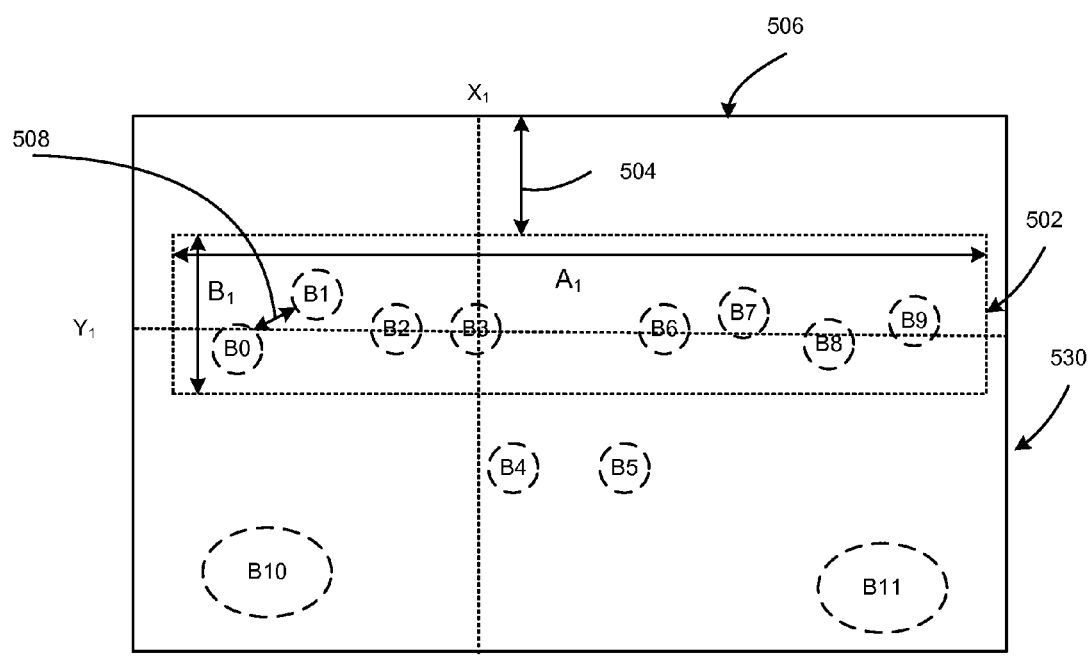
FIG. 5 is a diagram that illustrates detected location information and/or pressure data as input to a zone in an input area included in a base portion of a computing device.

FIG. 5 is a diagram that illustrates detected location information and/or pressure data as input to a zone 502 in an input area 530 included in a base portion of a computing device.

As described with reference to FIG. 4, the computing device can detect points B0-B9 and areas B10-B11 as the placement of hands of a user on the touch-sensitive surface of the input area 530 as if interacting with a virtual keyboard. The zone 502 can be identified as a particular size $(A_1 \times B_1)$ and can be located at a distance 504 from a top 506 of the input area 530. As shown in FIG. 5, the zone 502 can include points B0-B3 and B6-B9. The inclusion of the points B0-B3 and B6-B9 in the zone 502 can determine an input key that is associated with a detected point. In addition, a distance 508 between points (e.g., between two points, points B0 and B1) can also be used to determine an input key to associate with a detected point in the input area 530.

For example, areas B10-B11 can be the detected position of the palm of a left and right hand, respectively, of a user. Points B4 and B5 can be the detected position of the thumb of the user on their left hand and right hand, respectively. For example, points B4 and B5 can be associated with the space bar key of the virtual keyboard. Based on the location of the zone 502, the detection of the points B0-B3 and B6-B9 as being within the zone 502 and the distance 508, the point B0 can be associated with the "a" key of the virtual keyboard, and the point B1 can be associated with the "s" key of the virtual keyboard. If the pressure at the point B0 is detected as a heavy, high-pressure touch, the user is effectively inputting the letter "a" into an application executing on the computing device.

In some cases, a zone can identify a row of a virtual keyboard. The input area 530 could include multiple zones—one zone for each row of a virtual keyboard. The location of a detected point at a certain location within a particular zone (e.g., detected location coordinate $(x_1, y_1)$ of point B3 in zone 502) can be indicative of the associated key on the virtual keyboard (e.g., the "f" key). The zone 502 can identify a row of a virtual keyboard dependent on the relative location of points B0-B9 and areas B10-B11 even if, for example, the points B0-B3 and B6-B9 are rotated or shifted up or down within the zone 502.

Figure 6A:
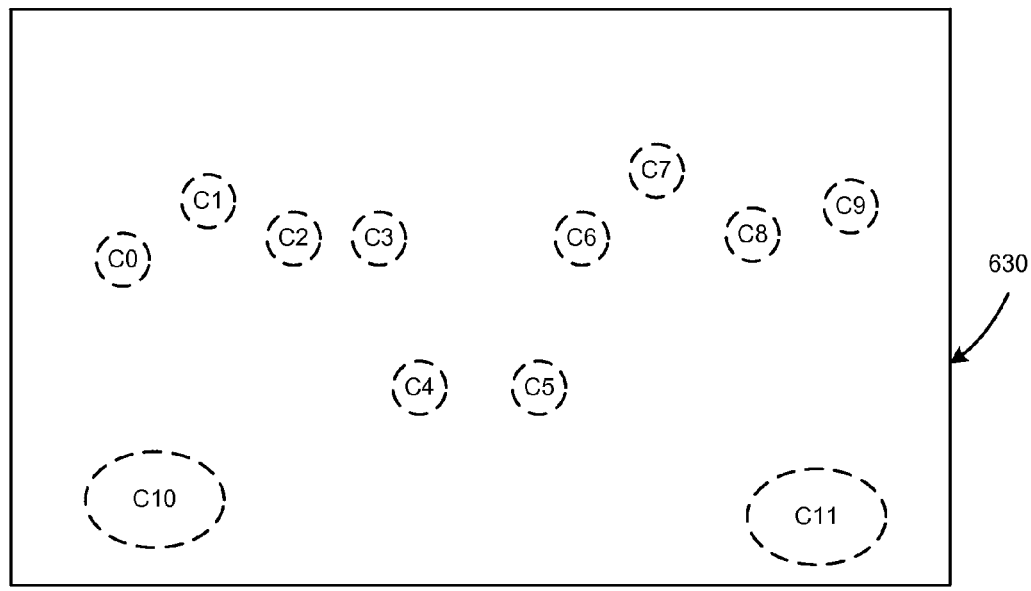
FIG. 6A is a diagram that illustrates input to an input area included in a base portion of a computing device for a keyboard mode of operation of the computing device.
Figure 6B:
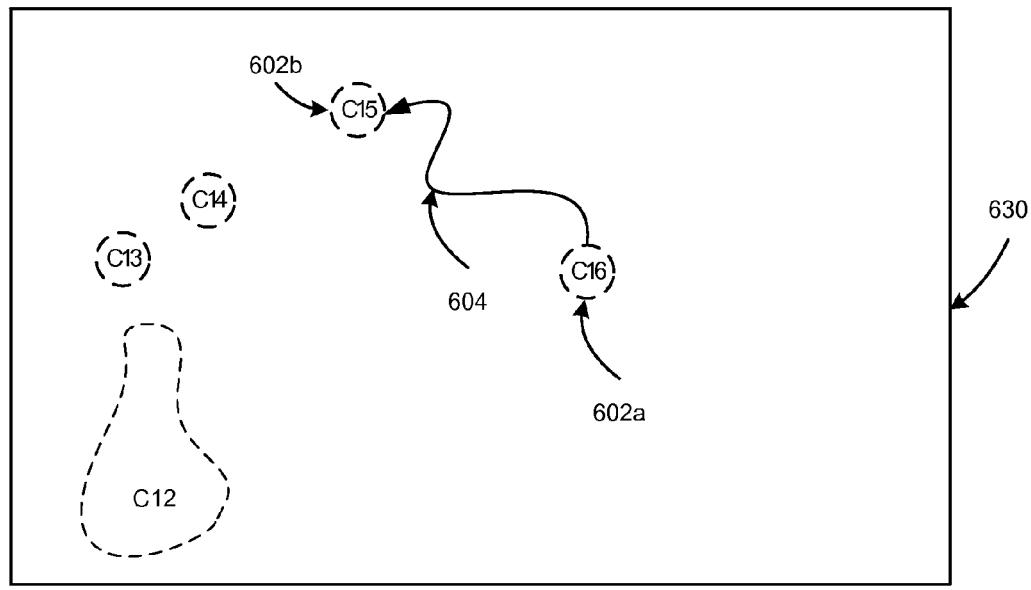
FIG. 6B is a diagram that illustrates input to an input area included in a base portion of a computing device for a single motion mode of operation of the computing device.
Figure 6C:
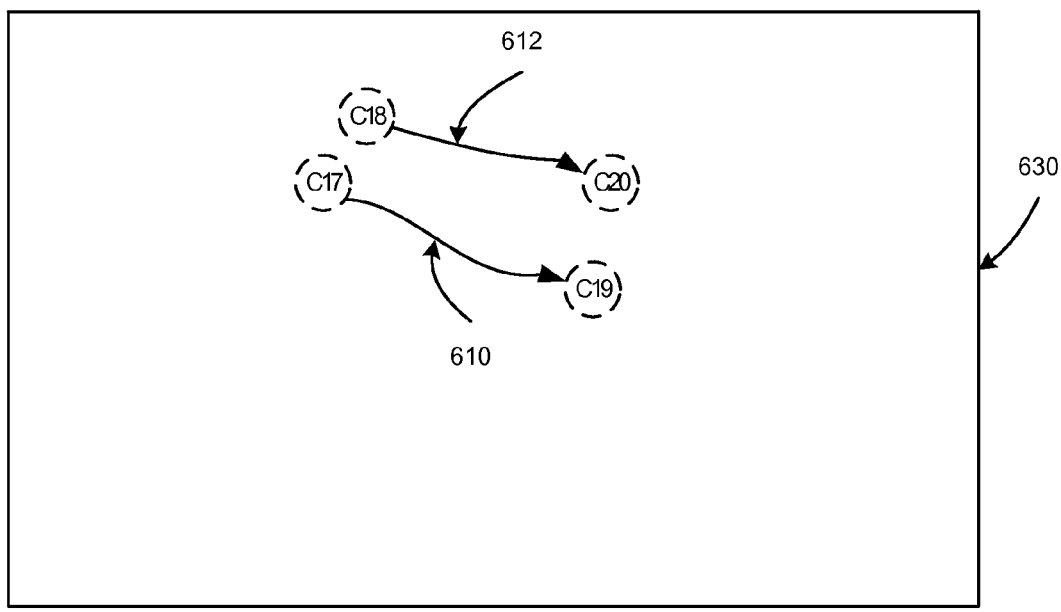
FIG. 6C is a diagram that illustrates input to an input area included in a base portion of a computing device for a multiple motion mode of operation of the computing device.

FIG. 6A is a diagram that illustrates input to an input area 630 included in a base portion of a computing device for a keyboard mode of operation for the computing device. FIG. 6B is a diagram that illustrates input to an input area 630 included in a base portion of a computing device for a single motion mode of operation for the computing device. FIG. 6C is a diagram that illustrates input to an input area 630 included in a base portion of a computing device for a multiple motion mode of operation for the computing device. FIGS. 6A-C illustrate how a user can change how they contact the input area 630 in order to change input modes of the computing device.

Referring to FIG. 6A, the touch-sensitive surface of the input area 630 can detect a location and applied pressure at each of points C0-C4 and area C10 as placement of fingers and a palm of a left hand of a user on the input area 630. The touch-sensitive surface of the input area 630 can detect a location and applied pressure at each of points C5-C9 and area C11 as placement of fingers and a palm of the right hand of the user in the input area 630. The computing device can determine, as described above, that the user is interacting with the input area 130 as if it were a keyboard input device. In this case, the input area 630 can function as a virtual keyboard for the computing device.

Next, referring to FIG. 6B, the user changes the input mode of the computing device by moving and/or relocating the position of their hands on the input area 630. In this example, the user removed their right hand from the input area 630, as shown by the lack of detected points C5-C9 and detected area C11 in the input area 630 shown in FIG. 6B. The computing device detects a light, low-pressure touch (based on a threshold condition and/or values) at points C13-16 and area C12, indicating the user is resting the palm of their left hand and two fingers (e.g., a pinky and ring finger) on the input area 630.

The user does place a finger at a first location in the input area 630 that is detected as a first point 602a based on an applied heavy, high-pressure touch. The user drags the finger along a path 604 in the input area 630 to a second location detected as the second point 602b. The computing device can identify the detected points C15-16 and the movement along the path 604 from point C16 to point C15 as a profile or condition for input to the computing device. Based on the identified profile or condition, the computing device can determined that the user is interacting with the input area 630 in a mouse mode, switching the input mode of the computing device from a keyboard mode, as shown in FIG. 6A to a mouse mode, as shown in FIG. 6B.

Continuing, as shown in FIG. 6C, the user changes the input mode of the computing device again by moving and/or relocating the placement and position of their hands on the input area 630. In this example, the user has removed both of their hands from the input area 630, as there are no areas detected in the input area 630 that would indicate the contact of a palm of a hand of a user with the touch-sensitive surface of the input area 630. The computing device does detect a heavy, high-pressure touch at points C17 and C18, where these points represent contact of two of fingers of a user with the touch-sensitive surface of the input area 630. The computing device can identify the detected points C17 and C18 and the movement along paths 610 and 612 to points C19 and C20, respectively, as a profile or condition for input to the computing device. Based on the identified profile or condition, the computing device can determined that the user is interacting with the input area 630 in a trackpad mode. The user can switch the input mode of the computing device from a keyboard mode, as shown in FIG. 6A, to a mouse mode, as shown in FIG. 6B, to a trackpad mode as shown in FIG. 6C, based on how they interact with the input area 630.

In some implementations, a user can interact with the input area 630 in the ways discussed with respect to FIGS. 6A-C when providing input to an application executing on the computing device. For example, the user can execute a document editing application. The user can enter text information into a document while in the detected keyboard mode in FIG. 6A, move and otherwise manipulate objects or document content while in the detected mouse mode of FIG. 6B, and move from page to page within a document while in the detected trackpad mode in FIG. 6C. In the detected trackpad mode of FIG. 6C, the movement of the detected points from C17 and C18 to C19 and C20, respectively, can represent a swiping motion used to turn a page in a document.

Figure 7:
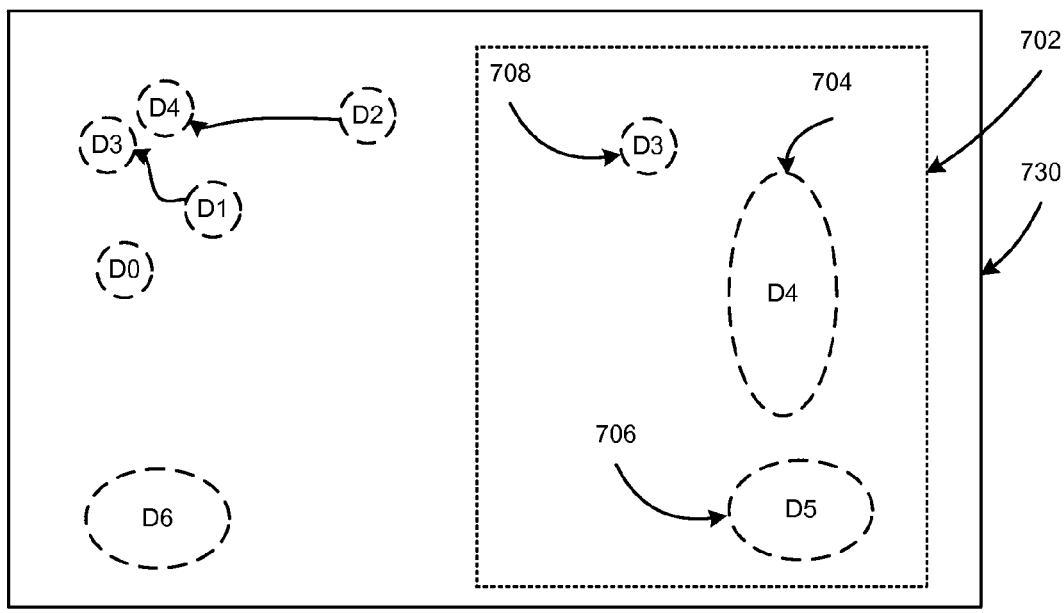
FIG. 7 is a diagram that illustrates input to an input area included in a base portion of a computing device where the input is both inside and outside of a zone.

FIG. 7 is a diagram that illustrates input to an input area 730 included in a base portion of a computing device where the input is both inside and outside of a zone 702. In some implementations, the computing device can ignore any detected any input (point 708 and areas 704 and 706) in the zone 702. The zone 702 may correspond to an area of a user interface for an application (shown on a display or display area of a computing device) that does not accept any form (or certain forms) of user input. For example, the area of the user interface for an application may be used to preview an image used by the application where any controls for manipulating the image are included in an area outside of the zone 702. In this example, a user may interact with the corresponding input area 730 that is outside of the zone 702 in order to provide input the application (or a different application).

Figure 8:
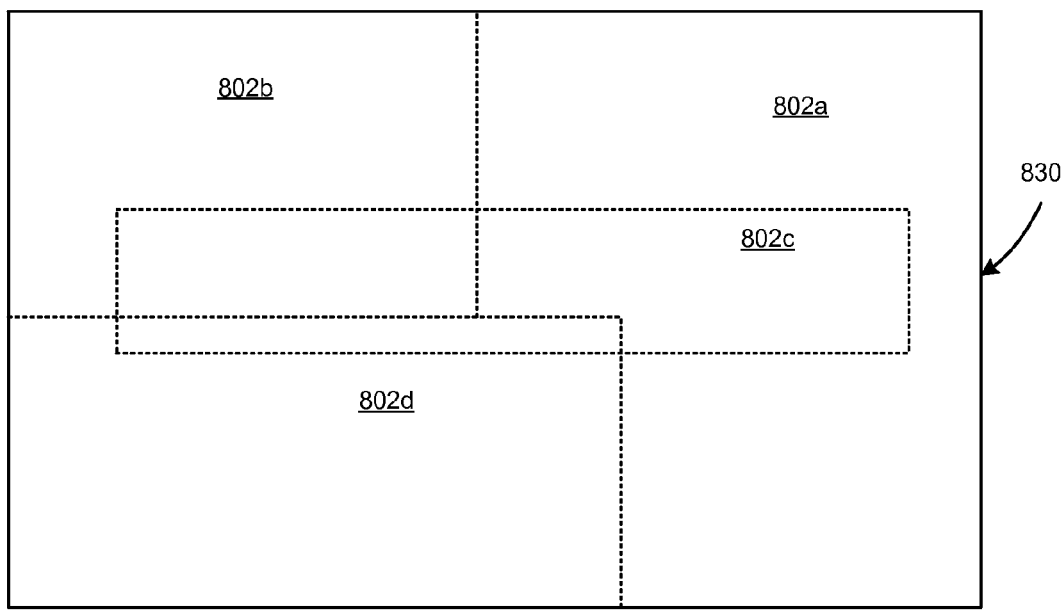
FIG. 8 is a diagram that illustrates multiple zones defined in an input area included in a base portion of a computing device.

FIG. 8 is a diagram that illustrates multiple zones 802a-d defined in an input area 830 included in a base portion of a computing device.

As shown in FIG. 8, multiple zones 802a-d can be identified within the input area 830. In some implementations, one or more of the zones may overlap. In some implementations, none of the zones may overlap. As described with reference to FIGS. 5 and 8, in some cases, detected input in a particular area may be ignored dependent on the user interface associated with the zone. In other cases, detected input may be determined based on the zone in which the input is detected. In some implementations, a profile can be associated with a zone, the profile indicating how to interpret any detected input within the zone. For example, referring to FIG. 2, the interaction profile detection module 230 can provide the location within a particular zone of one or more contact points and/or areas and the amount of time associated with each contact point and/or area within the particular zone as an interaction profile or set of conditions for the particular time. The interaction profile detection module 230 can provide the interaction profile to an input mode selection module 240 that can use a prediction module 242 to determine an input mode, associated with the particular zone, for the computing device 210.

Figure 9A:
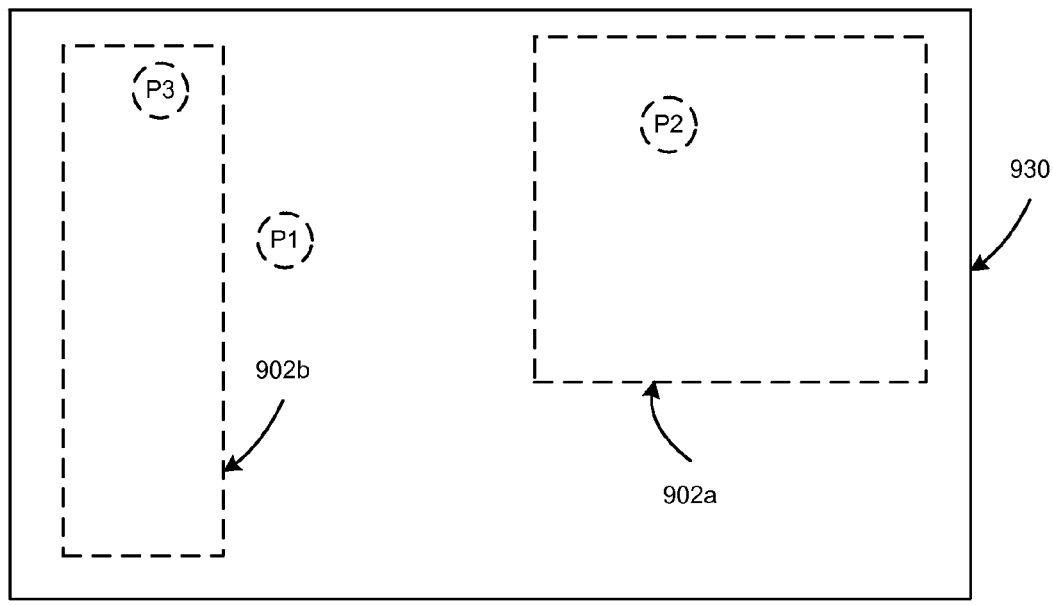
FIGS. 9A and 9B are diagrams that illustrate multiple zones defined in an input area included in a base portion of a computing device.
Figure 9B:
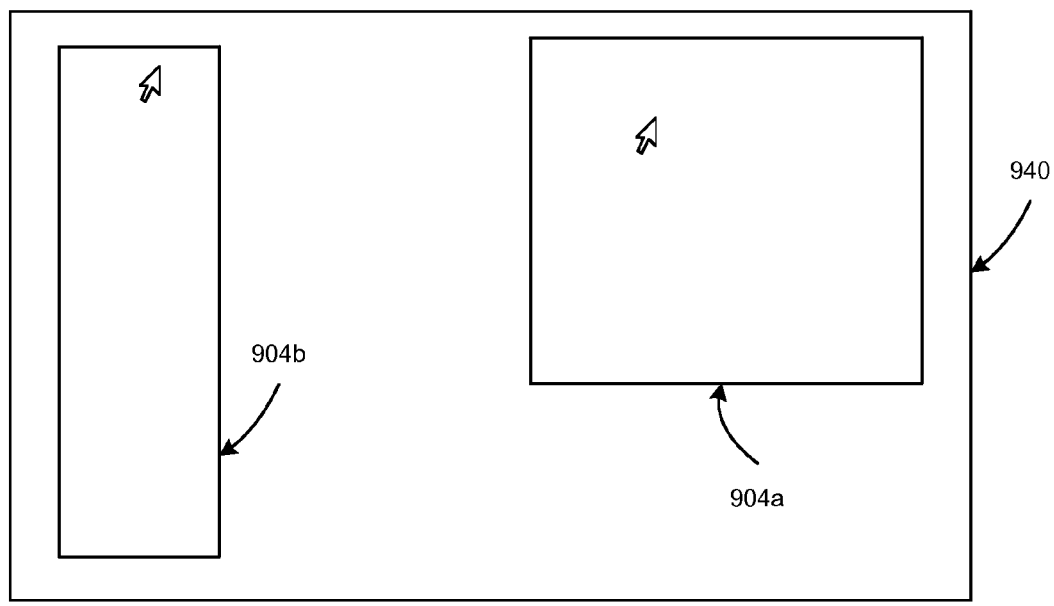

FIGS. 9A and 9B are diagrams that illustrate multiple zones 902a-b defined in an input area 930 included in a base portion of a computing device, where each zone 902a-b corresponds to a region 904a-b, respectively, in the display area 940 of the display portion of a computing device, and each region 904a-b corresponds to an application. A user may interact in a different manner with each zone 902a-b. For example, user interactions within zone 902a may be indicative of a trackpad input device. User interactions within zone 902b may be indication of a mouse input device. In addition, interactions with the input area 930 not included in either of the zones 902a-b may be ignored. For example, the input area 930 outside of the zones 902a-b may not be associated with a user interface included in the display area 940.

For example, referring to FIG. 2, the interaction profile detection module 230 can receive the location of contact with a touch-sensitive surface of the input area 930 and an amount of time for the contact as a detected point P2 in the zone 902a. The interaction profile detection module 230 can provide the interaction profile to the input mode selection module 240 that can use the prediction module 242 to determine a first input mode (e.g., potential or target mode) to associate with the zone 902a for input to the region 904a corresponding to the zone 902a. Similarly, the interaction profile detection module 230 can receive the location of contact with a touch-sensitive surface of the input area 930 and an amount of time for the contact as a detected point P3 in the zone 902b. The interaction profile detection module 230 can provide the interaction profile to the input mode selection module 240 that can use the prediction module 242 to determine a second input mode (e.g., potential or target mode) to associate with the zone 902b for input to the region 904b corresponding to the zone 902b. In some cases, the first input mode and second input mode for region 904a and region 904b, respectively, can be the same (e.g., both input modes are a mouse input mode). In other cases, the first input mode and second input mode for region 904a and region 904b, respectively, can be different (e.g., input mode for region 904a is a keyboard mode and input mode for region 904b is a mouse mode).

FIG. 10 is a flowchart that illustrates a method 1000 of associating an input mode for a computing device with indicators of interactions of a user with an input area included in a base portion of the computing device. In some implementations, the method 1000 can be implemented by the computing devices described herein.

The method 1000 begins by receiving a plurality of indicators of interactions of a user with a plurality of locations of a touch-sensitive surface of an input area included in a base portion of a computing device (block 1010). In some implementations, the user may place both hands and all of their fingers in contact with the touch-sensitive surface of the input area. In other implementations, a user may place one or more of their fingers at various locations within the input area where fewer than all of their fingers may contact the touch-sensitive surface of the input area.

A plurality of indicators of pressure associated with at least a portion of the plurality of interactions is received (block 1020). In some implementations, each finger and the palm of each hand of a user, if in contact with the touch-sensitive surface of the input area, may apply a different pressure on the touch-sensitive surface as received by the plurality of indictors of pressure.

A first interaction profile based on a first portion of the plurality of indicators of interactions and based on a first portion of the plurality of indicators of pressure is selected (block 1030). In some implementations, the plurality of indicators of interactions and their associated pressures can be indicative of a first interaction profile of an interaction of a user with the touch-sensitive surface of the input area. In some implementations, the first interaction profile can be based on learned or trained information for the user.

A first input mode is associated with the first portion of the plurality of indicators of interactions based on the first interaction profile (block 1040). In some implementations, the first input mode can be associated with the interaction of a user with the touch-sensitive surface of the input area while entering or otherwise manipulating data in an application executing on the computing device. For example, the first input mode may be one of a keyboard mode, a mouse mode, or a trackpad mode of operation.

A second input mode is associated with a second portion of the plurality of indicators of interactions based on a second interaction profile different from the first interaction profile (block 1050). In some implementations, the second input mode is indicative of the user changing how they interact with the touch-sensitive surface of the input area in order to input or otherwise manipulate data or objects in the application executing on the computing device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user ca provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computing device comprising:
a display portion including a display area;
a base portion coupled to the display portion;
a touch-sensitive surface of an input area included in the base portion, the touch-sensitive surface of the input area having a surface area greater than half of a surface area of the display area of the display portion, the input area being a non-display area;
a zone module configured to:
partition the input area into a first zone and a second zone, the first zone including a first subset of the surface area of the touch-sensitive surface, and the second zone including a second subset of the surface area of the touch-sensitive surface, the second zone being different from the first zone;
correlate a first section of the display area with the first zone based on a first application running on the computing device, the correlation providing a relative positioning between the first section of the display area and the first zone; and
correlate a second section of the display area with the second zone based on a second application running on the computing device, the second section being different from the first section, the correlation providing a relative positioning between the second section of the display area and the second zone;
a touch detection module configured to:
detect a first interaction of a user with the touch-sensitive surface included in the first zone, the detected first interaction identifying a first plurality of indicators of pressure associated with a first plurality of indicators of interactions of the user with a first plurality of locations of the touch-sensitive surface included in the first zone; and
detect a second interaction of the user with the touch-sensitive surface included in the second zone, the detected second interaction identifying a second plurality of indicators of pressure associated with a second plurality of indicators of interactions of the user with a second plurality of locations of the touch-sensitive surface included in the second zone;
an interaction profile detection module configured to:
select a first interaction profile to associate with the first zone, the selection based on the detected first interaction of the user with the touch-sensitive surface included in the first zone; and
select a second interaction profile to associate with the second zone, the selection based on the detected second interaction of the user with the touch-sensitive surface included in the second zone; and
an input mode selection module configured to:
associate a first input mode with the first zone based on the first interaction profile;
associate a second input mode with the second zone based on the second interaction profile;
determine a first dynamic scaling between the display area and the touch-sensitive surface of the input area based on the first input mode; and
determine a second dynamic scaling between the display area and the touch-sensitive surface of the input area based on the second input mode.

2. The computing device of claim 1,
wherein an indication of an interaction of a user at a location of the touch-sensitive surface included in the first zone corresponds to an interaction of the user with content rendered in the first section of the display area, and
wherein an indication of an interaction of a user at a location of the touch-sensitive surface included in the second zone corresponds to an interaction of the user with content rendered in the second section of the display area.

3. An apparatus, comprising:
a display portion including a display area;
a base portion coupled to the display portion;
a touch-sensitive surface of an input area included in the base portion,
the input area being a non-display area,
the base portion excluding a mechanical keyboard, and
the display portion being positioned relative to the base portion such that the input area and the display area do not overlay one another when a user is interacting with the input area;
a touch detection module configured to:
detect a first interaction of a user with the touch-sensitive surface of the input area, the detected first interaction identifying a first plurality of indicators of pressure associated with a first plurality of indicators of interactions of the user with a first plurality of locations of the touch-sensitive surface; and
subsequent to detecting the first interaction, detect a second interaction of the user with the touch-sensitive surface of the input area, the detected second interaction identifying a second plurality of indicators of pressure associated with a second plurality of indicators of interactions of the user with a second plurality of locations of the touch-sensitive surface, the second interaction being different from the first interaction; and
an input mode selection module configured to:
determine a first input mode of operation for the apparatus based on the detected first interaction of the user with the touch-sensitive surface of the input area;
subsequent to determining the first input mode of operation, determine a second input mode of operation for the apparatus based on the detected second interaction of the user with the touch-sensitive surface the input area, the second input mode of operation being different from the first input mode of operation;
determine a first dynamic scaling between the display area and the touch-sensitive surface of the input area based on the determined first input mode of operation; and
determine a second dynamic scaling between the display area and the touch-sensitive surface of the input area based on the determined second input mode of operation.

4. The apparatus of claim 3, wherein the touch-sensitive surface of the input area has a surface area greater than half of a surface area of the display area of the display portion.

5. The apparatus of claim 4, wherein the display area is a touch-sensitive display device and the input area is a planar, touch-sensitive surface.

6. The computing device of claim 1,
wherein the first input mode corresponds with a first input device type, and
wherein the second input mode corresponds with a second input device type, the second input device type being different from the first input device type.

7. The computing device of claim 1, wherein the first plurality of indicators of interactions are mutually exclusive with the second plurality of indicators of interactions.

8. The computing device of claim 1, wherein the interaction profile detection module is further configured to select the first interaction profile and select the second interaction profile based on at least one of learned information and trained information.

9. The computing device of claim 1,
wherein the touch detection module is further configured to identify a first plurality of indicators of time associated with each of the first plurality of indicators of interactions of the user with the first plurality of locations of the touch-sensitive surface included in the first zone; and
wherein the interaction profile detection module is further configured to select the first interaction profile based on the first plurality of indicators of time.

10. The computing device of claim 1, wherein the first plurality of indicators of interactions of the user with the first plurality of locations of the touch-sensitive surface include a first plurality of indicators of hovering interactions of the user.

11. The computing device of claim 1, wherein the first plurality of indicators of interactions of the user with the first plurality of locations of the touch-sensitive surface are indicative of an orientation of a human hand.

12. A computing device comprising:
a display portion including a display area;
a base portion coupled to the display portion;
a touch-sensitive surface of an input area included in the base portion,
the touch-sensitive surface of the input area having a surface area greater than half of a surface area of the display area of the display portion,
the input area being a non-display area, and the display portion being positioned relative to the base portion such that the input area and the display area do not overlay one another when a user is interacting with the input area;

a zone module configured to:
   partition the input area into at least a first zone and a second zone, the first zone including a first subset of the surface area of the touch-sensitive surface, and the second zone including a second subset of the surface area of the touch-sensitive surface, the second zone being different from the first zone;
   correlate a first section of the display area with the first zone based on a first application running on the computing device, the correlation providing a relative positioning between the first section of the display area and the first zone; and
   correlate an interaction of a user at a location of the touch-sensitive surface included in the first zone with content rendered in the first section of the display area; and an input mode selection module configured to:
   detect the interaction of the user at the location of the touch-sensitive surface included in the first zone;
   determine an input mode of operation for the computing device based on the detected interaction of the user with the touch-sensitive surface included in the first zone;
   determine a dynamic scaling between the display area and the touch-sensitive surface included in the first zone based on the determined input mode of operation; and
   provide the detected interaction of the user at the location of the touch-sensitive surface included in the first zone as input to the first application.

13. The computing device of claim 12,
wherein the zone module is further configured to:
   correlate a second section of the display area with the second zone based on a second application running on the computing device, the correlation providing a relative positioning between the second section of the display area and the second zone, and
   correlate an interaction of a user at a location of the touch-sensitive surface included in the second zone with content rendered in the second section of the display area; and
wherein the input mode selection module is further configured to:
   detect the interaction of the user at the location of the touch-sensitive surface included in the second zone; and
   provide the detected interaction of the user at the location of the touch-sensitive surface included in the second zone as input to the second application.

14. The computing device of claim 12,
wherein the zone module is further configured to:
   correlate a second section of the display area with the second zone based on a second application running on the computing device, the correlation providing a relative positioning between the second section of the display area and the second zone, and
   not correlate an interaction of a user at a location of the touch-sensitive surface included in the second zone with content rendered in the second section of the display area; and
wherein the input mode selection module is further configured to:
   detect the interaction of the user at the location of the touch-sensitive surface included in the second zone; and
   not provide the detected interaction of the user at the location of the touch-sensitive surface included in the second zone as input to the second application.

15. The computing device of claim 2, wherein the second input mode is different from the first input mode.

16. The computing device of claim 15,
wherein associating the first input mode with the first zone is further based on the first application running on the computing device, and
wherein associating the second input mode with the second zone is further based on the second application running on the computing device.

17. The computing device of claim 16, wherein the first application is different from the second application.

18. The computing device of claim 16, wherein the first application and the second application are the same application.

19. The computing device of claim 2,
wherein the interaction of the user at the location of the touch-sensitive surface included in the first zone has a one-to-one correspondence with the content rendered in the first section of the display area, and
wherein the interaction of the user at the location of the touch-sensitive surface included in the second zone has a one-to-one correspondence with the content rendered in the second section of the display area.

20. The apparatus of claim 3,
wherein the first input mode corresponds with a first input device type, and
wherein the second input mode corresponds with a second input device type, the second input device type being different from the first input device type.

* * * * *